United States Patent [19]
Johnson

[11] 4,240,724
[45] Dec. 23, 1980

[54] ZONE FOCUSING OPTICAL SYSTEM

[75] Inventor: Bruce K. Johnson, Andover, Mass.

[73] Assignee: Polaroid Corporation, Cambridge, Mass.

[21] Appl. No.: 80,433

[22] Filed: Oct. 1, 1979

[51] Int. Cl.³ .............................................. G03B 3/00
[52] U.S. Cl. .................................. 354/197; 350/183; 354/288
[58] Field of Search ................ 354/197, 288; 350/183, 350/192, 194, 254

[56] References Cited

U.S. PATENT DOCUMENTS

| | | |
|---|---|---|
| 494,128 | 3/1893 | Decker . |
| 1,651,493 | 12/1927 | Warmisham . |
| 1,810,598 | 6/1931 | Cummings . |
| 1,973,203 | 9/1934 | Goldberg . |
| 2,063,178 | 12/1936 | Merte . |
| 2,327,859 | 8/1943 | Bolsey . |
| 2,482,571 | 9/1949 | Arnold .............................. 354/197 X |
| 2,586,418 | 2/1952 | Davis . |
| 2,669,709 | 2/1954 | Glancy et al. . |
| 3,388,650 | 6/1968 | Westphalen . |
| 3,418,908 | 12/1968 | Land . |
| 3,479,942 | 11/1969 | Land et al. .......................... 354/197 X |
| 3,648,056 | 3/1972 | Buttweiler et al. . |
| 3,902,792 | 9/1975 | Plummer .............................. 350/189 |
| 3,925,797 | 12/1975 | Ettischer .............................. 354/197 |
| 4,105,308 | 8/1978 | Owen et al. .......................... 350/189 |
| 4,167,316 | 9/1979 | Johnson et al. ....................... 354/197 |

Primary Examiner—John Gonzales
Attorney, Agent, or Firm—Samuel H. Dworetsky; Peter V. D. Wilde

[57] ABSTRACT

A compact zone focusing lens system is provided for use as a photographic camera objective. In the system, a positive meniscus lens is mounted in registration with the larger opening of a truncated, opaque, open-ended cone section the apical end of which serves as a maximum system aperture stop. A transparent disk having a plurality of meniscus lens elements integrally molded therein is mounted so that its lens elements can be selectively rotated into alignment with the cone section apical opening to provide system focal lengths which are appropriate for sharply focusing objects located within different object distance ranges.

8 Claims, 18 Drawing Figures

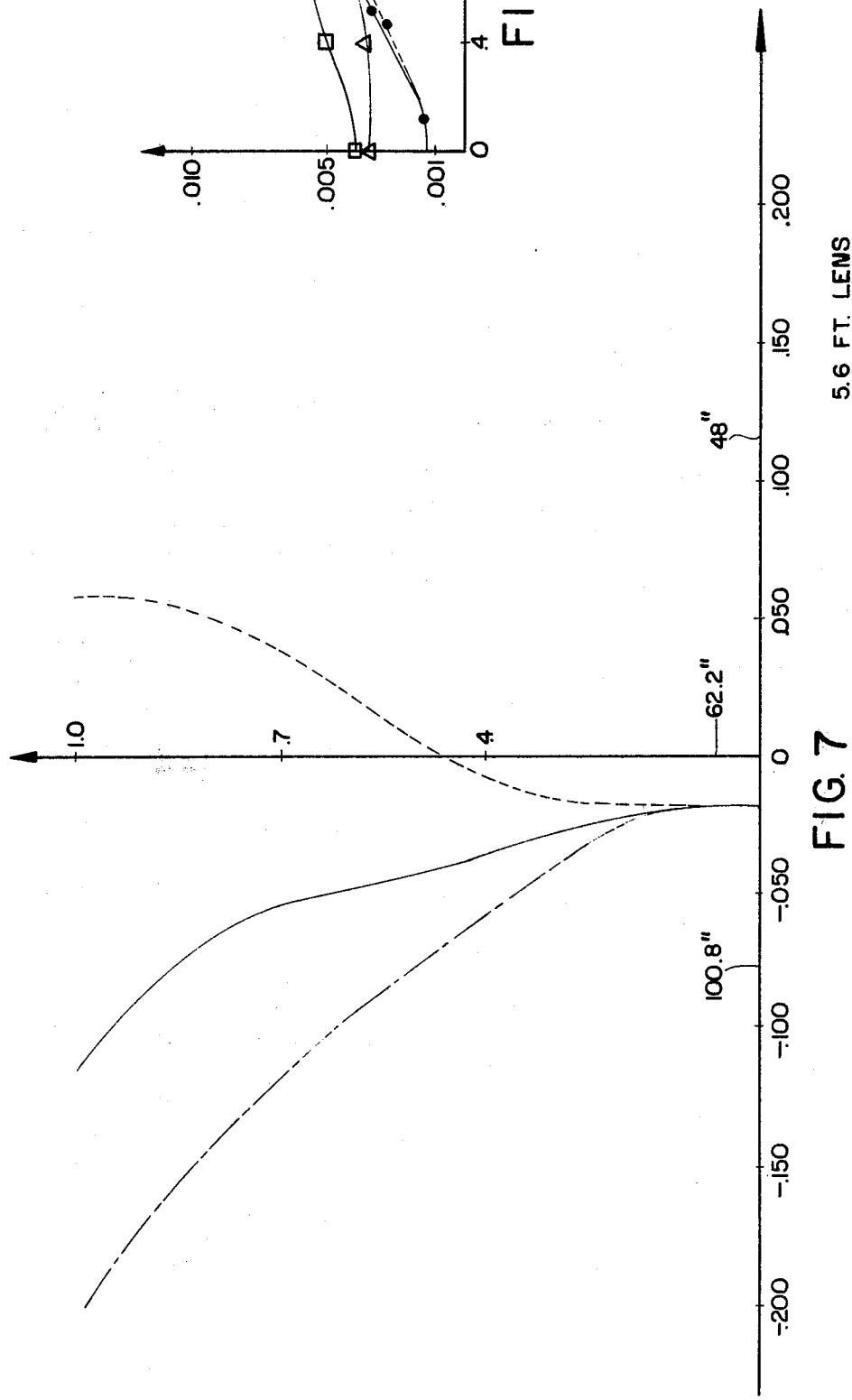

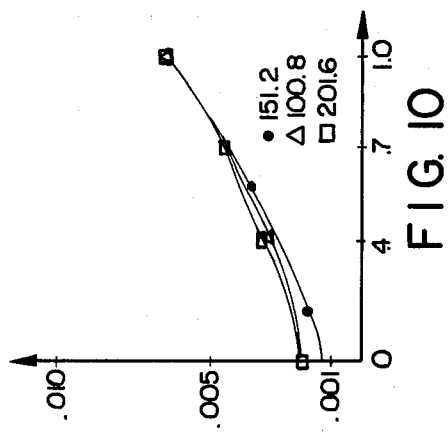
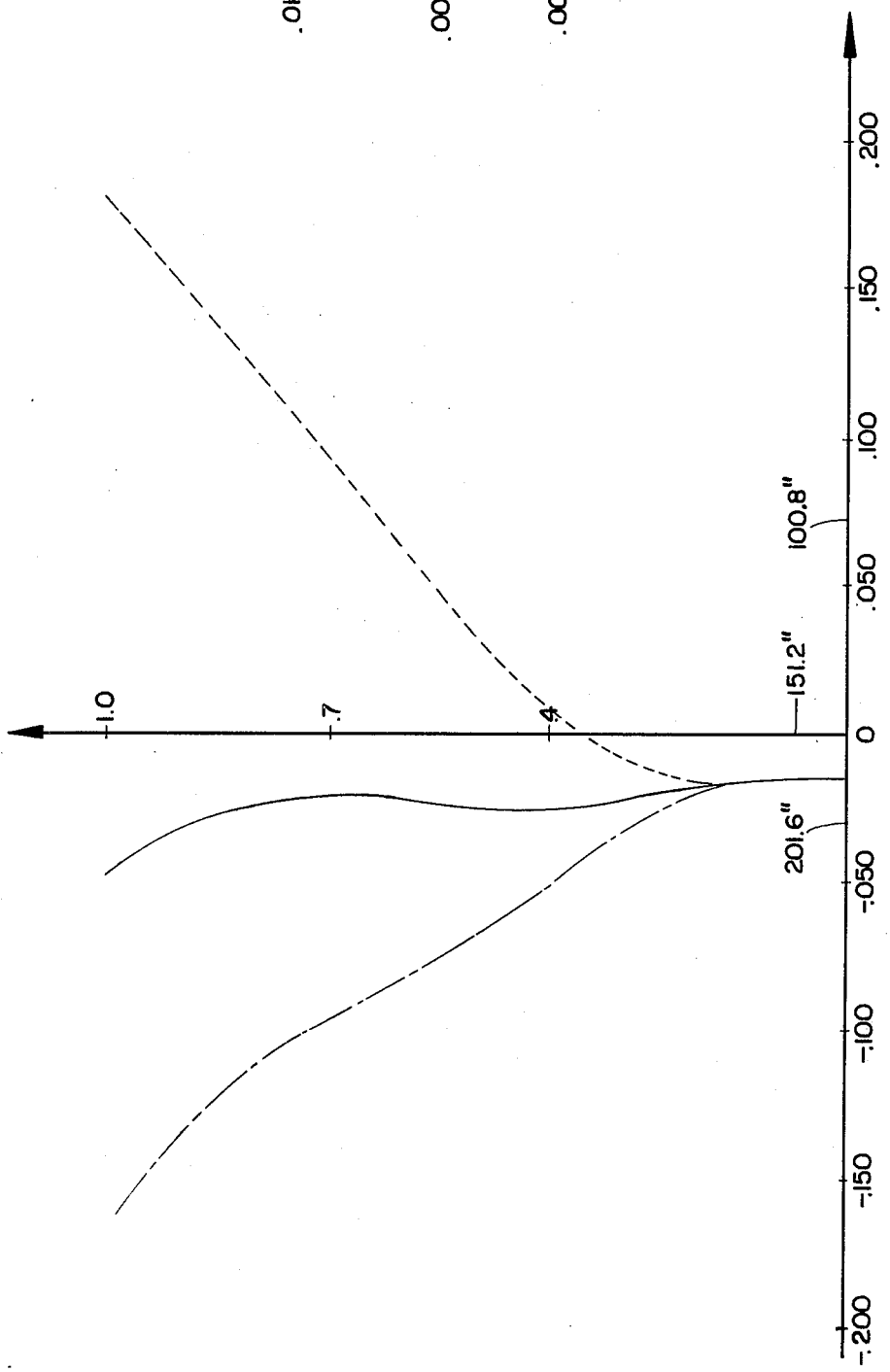

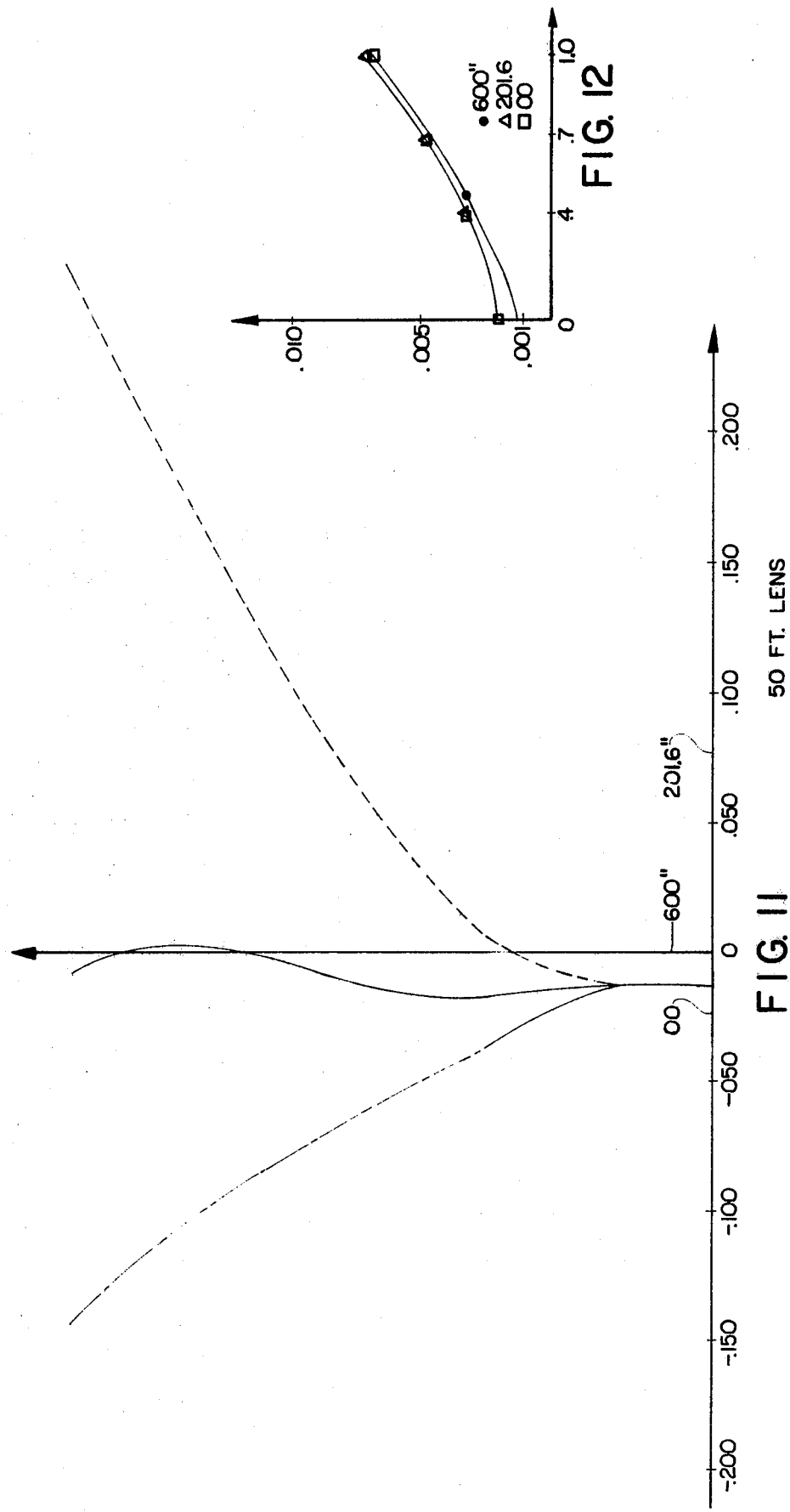

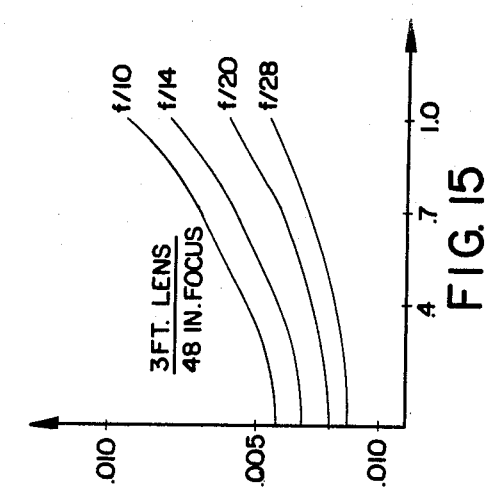
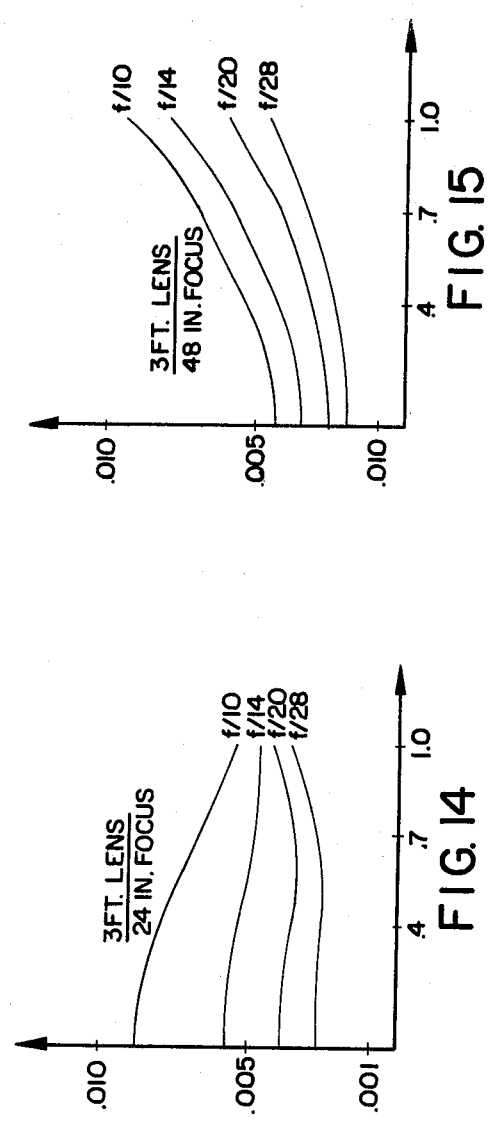
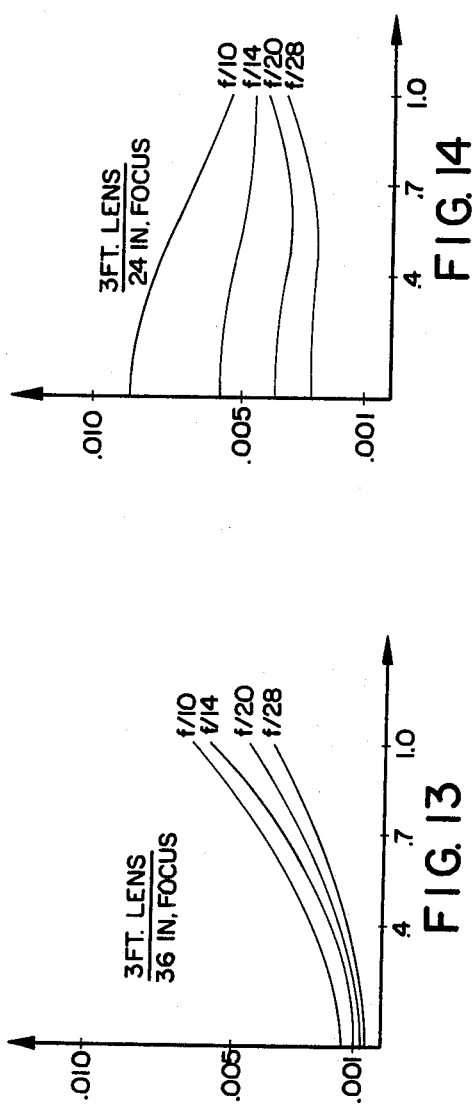
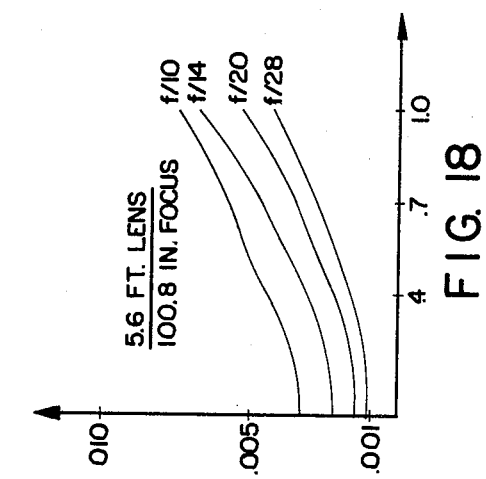
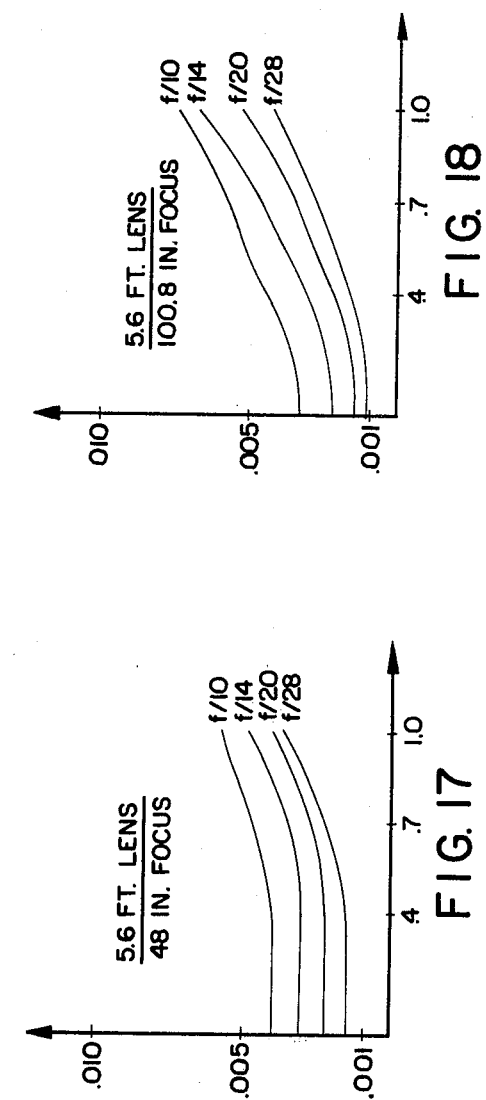
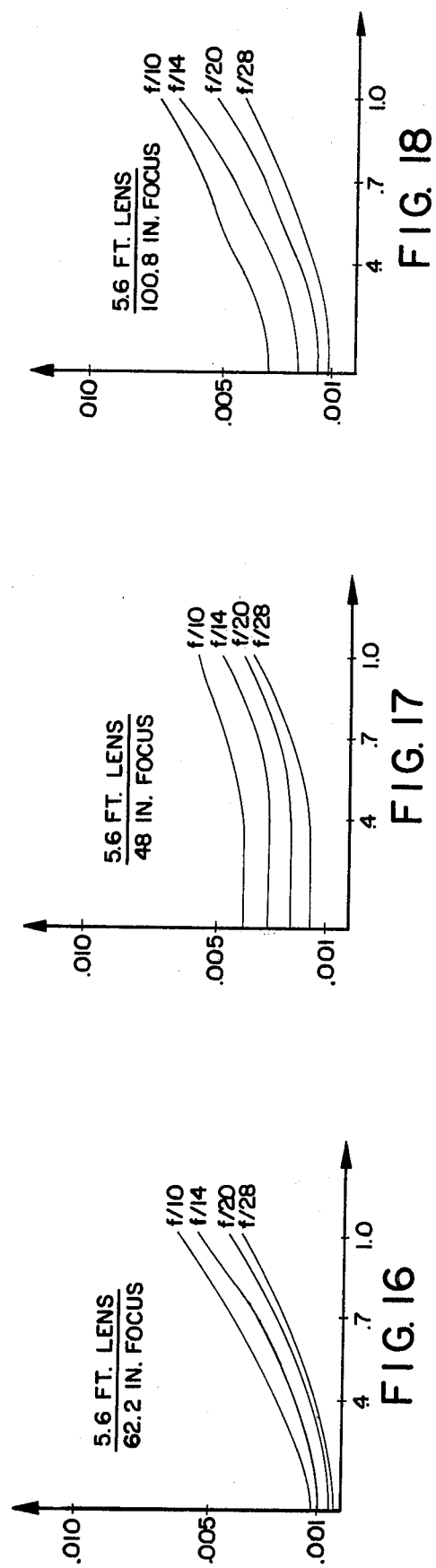

ZONE FOCUSING OPTICAL SYSTEM

BACKGROUND OF THE INVENTION

1. Field of the Invention

This invention in general relates to photographic optical systems and in particular to a zone focusing optical system particularly suitable for use in a camera of the type which includes an automatic ranging and focusing arrangement.

2. Description of the Prior Art

According to the well-known Gaussion lens equation, an image of an object which is located ahead of an optical system will only be sharply formed on film located behind the optical system when the distance between the optical system and the focal length of the system is correct. Since the location of film in photographic cameras is typically fixed, this means that sharpest imaging at a given object distance requires a unique focal length or a unique optical system to film distance. The process of adjusting the optical system focal length, or the optical system to film distance, to achieve maximum image sharpness at different object distances is known as focusing and may be accomplished in well-known ways. One way of focusing, for example, is to provide a lens of fixed focal length in combination with a means for adjusting the spacing between the lens and film as a function of object distance. The usual arrangements for accomplishing this involve the use of a flexible bellows connecting the lens mount to the film retaining housing and a linkage for extending the bellows to alter the spacing between the optical system and film.

Another known focusing arrangement utilizes a variable focus optical system fixed in place ahead of the film. Here the lens focal length is changed with object distance by changing the air spacing between individual elements of the lens, usually by moving a front cell of the lens with respect to other elements or an element.

Another known focusing arrangement suitable for use with fixed lens to film distance situations involves the use of a rotatable lens turret which carries a plurality of lenses having different focal lengths each of which can be rotated into place along the camera taking path. These arrangements can be classified as zone focusing systems because they do not provide a continuously variable focal length but rather provide discrete focal lengths which sharply image for particular object distances and more or less sharply image objects located on either side of that object distance most appropriate for the particular lens focal length. In this manner, such systems provide adequate sharpness over a range or "zone" of object distances relying on the assumption that for any given focal length there exists a blur, due to defocus, of small enough size such that the performance of the system will not be adversely affected provided that the object remains in the appropriate zone. An example of such a system is shown and described in, for instance, U.S. Pat. No. 3,418,908 issued to Edwin H. Land on Dec. 31, 1968 and entitled "Range Finding-Focusing Apparatus For A Photographic Camera".

It is also known to provide zone focusing arrangements by combining a fixed lens with a turret having lenses which can be selectively indexed into alignment with the fixed lens such that combinations of the fixed lens with individual turret lenses provide a series of different focal lengths. One such arrangement which utilizes a fixed doublet is described in U.S. Pat. No. 494,128 issued to Erskine Decker on Mar. 28, 1893 and entitled "Lens For Cameras".

Of the three focusing arrangements described, the first two have the advantage of continuous adjustability over a range of object distances. However, for a particular application this advantage must be evaluated in view of the increased cost associated with the need for bellows extension arrangements or more complex multi-element lens systems. Zone focusing systems, while not offering the continuous adjustability feature, are often adequate and offer an attractive alternate because they can generally be made less expensively, than the others. However, most known zone focusing systems are somewhat cumbersome, requiring a large amount of space because of their turret arrangements. Therefore, it is a primary object of the present invention to provide a zone focusing system which is inexpensive, compact and easy to manufacture.

It is another object of this invention to provide a zone focusing optical system that is particularly suitable for use with a camera of the type which includes a sonar ranging system and an arrangement for automatically positioning a lens disk as a function of select object distances.

Other objects of the invention in part will be obvious and in part will appear hereinafter. The invention accordingly comprises the apparatus possessing the construction, combination of elements, and arrangement of parts which are exemplified in the following detailed description.

SUMMARY OF THE INVENTION

This invention generally relates to photographic optical systems and specifically to a zone focusing optical system which is particularly suitable for use in camera apparatus of the type which includes an automatic ranging and focusing arrangement by which a lens disk can be selectively indexed by rotation; and means for facilitating the positioning of film on a plane in which it may be exposed and for providing a path of predetermined length along which light can be directed through an entrance aperture thereof toward the film plane.

The zone focusing optical system of the invention comprises means for defining an opaque housing structured to admit light from a scene into the apparatus light path entrance. The housing includes an open-ended section having spaced apart inlet and outlet apertures optically aligned with respect to one another and with the apparatus light path entrance along an axis which extends through the center of the apparatus light path entrance. Included in the open-ended section are intermediate opaque convergent portions, which connect the inlet and outlet apertures thereof, for excluding light from entering the housing. The outlet aperture is positioned adjacent the apparatus light path entrance and is spaced forwardly thereof by a predetermined distance.

Also included is a prime lens of predetermined positive power. The prime lens is mounted in optical registration with the inlet aperture and is structured to refract all the chief rays from all image forming bundles of rays which originate from a predetermined object distance, less than infinity, from the prime lens so that such chief rays pass through the center of the outlet aperture and are imaged over the film plane.

Additionally included is a lens disk which has a plurality of angularly spaced apart light refracting zones each of which is structured to optically cooperate with the prime lens to in combination therewith image an object at a different distance from the prime lens than the predetermined object distance for which the prime lens is structured.

The lens disk, which is preferably molded of a transparent optical plastic, is mounted behind the outlet aperture in the predetermined space between the outlet aperture and the apparatus light path entrance for rotation such that each light refracting zone thereof can be selectively indexed into optical registration with the outlet aperture. The outlet aperture operates to define the active light refracting area of each of the light refracting zones of the lens disk and to define a maximum aperture stop for each of the light refracting zones in combination with the prime lens.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIGS. 5 through 12 are graphs, normalized to 1.0 at full half field angle, showing the optical performance of various combinations of lenses of the invention—odd numbered figures showing field sags, and even, RMS blur; and FIGS. 13 through 18 are graphs normalized to 1.0 at full half field angle showing RMS blur for various combinations of lenses of the invention at different focus distances and apertures.

DESCRIPTION OF THE PREFERRED EMBODIMENT

Figure 1:
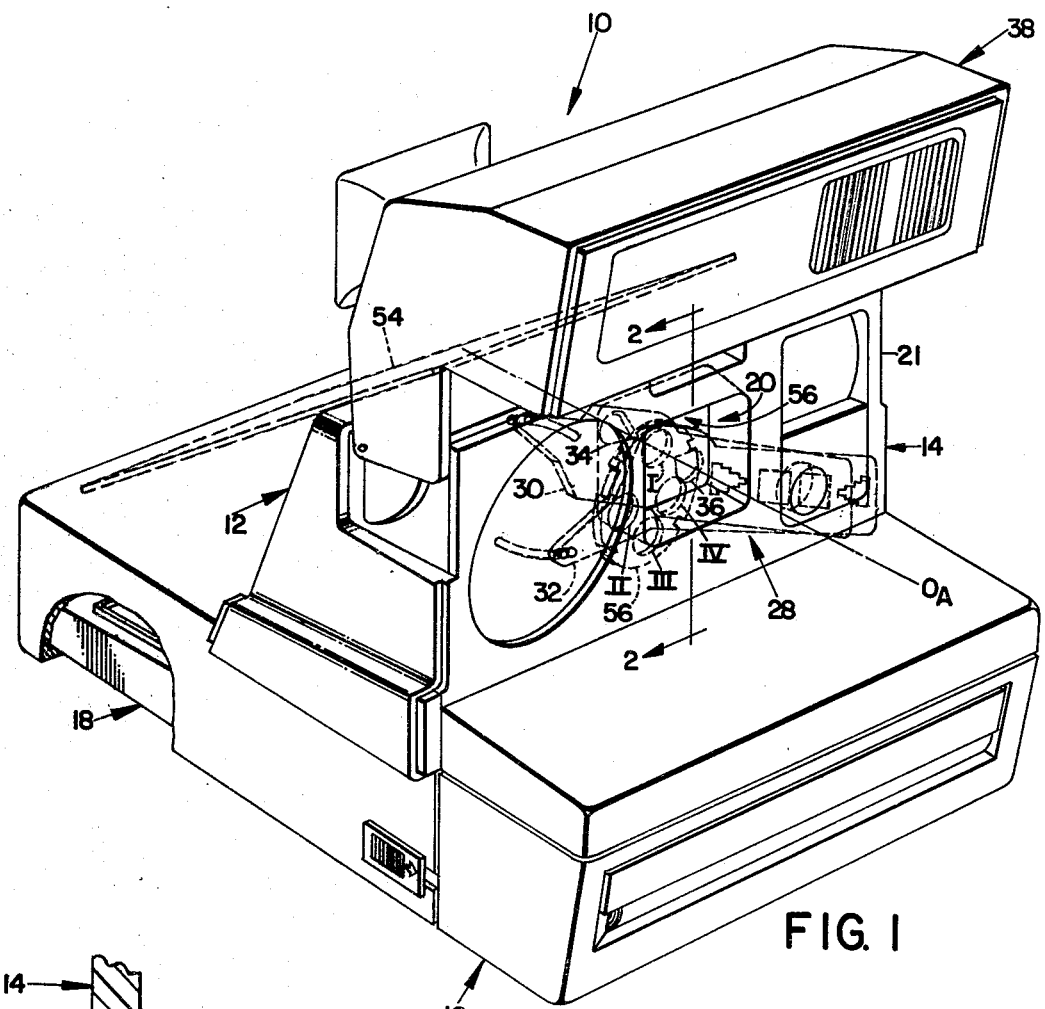
FIG. 1 is a diagrammatic perspective view of a camera in which the present invention is incorporated.
Figure 2:
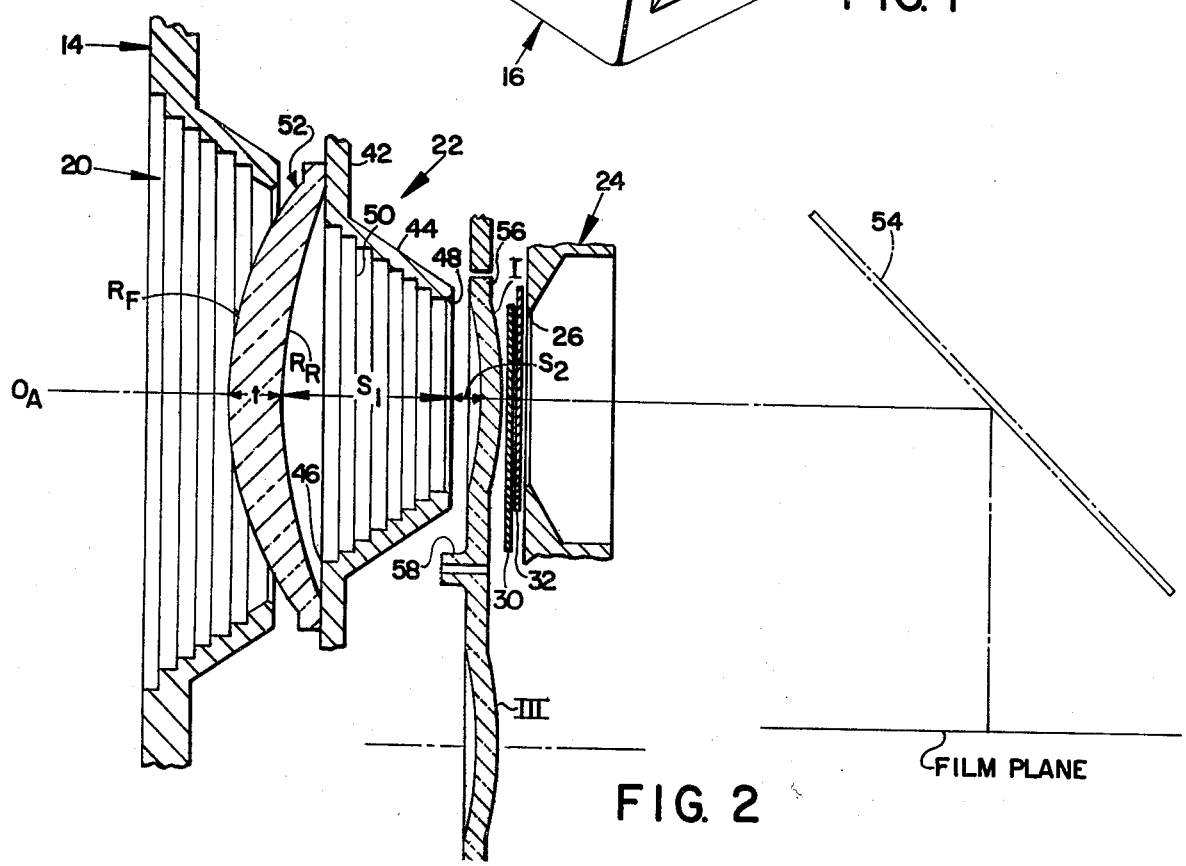
FIG. 2 is an enlarged section view of the invention taken generally along line 2—2 of FIG. 1.

In its preferred embodiment, the zone focusing optical system of the present invention is shown as part of a virtually fully automatic type camera which utilizes self-processable type film and which is designated generally at 10 in FIG. 1. Although shown incorporated in the camera 10, it is to be understood that the optical system of the invention, which is designated generally at 22 in FIG. 2, is not limited in use to only those types of photographic apparatus represented by the camera 10. However, as will be discussed below, the camera 10 does have certain features which make the invention at least in part particularly suitable for use with it.

As best seen in FIG. 1, the camera 10 is a rigid, nonfolding body type which includes a generally prismatic shaped major housing 12, a generally L-shaped front housing 14, and a generally rectangularly-shaped film loading door 16 which collectively define its outward appearance and serve to house and protect its interior components. The aforementioned housings, 12 and 14, and the film loading door 16 are all preferably molded of an opaque plastic to preclude unwanted light from entering the camera interior.

The base of the prismatic housing 12 is adapted in a well-known manner to releasably receive and hold a film cassette 18 in which is disposed a stacked array of self-processable film units, each of which is processed by the camera 10 in a well-known manner after photo-exposure, and a flat, thin battery which is positioned underneath the array of film units (neither shown). The film cassette battery is used to supply power to operate the various electrical components of the camera 10. An example of such film cassettes is described in considerable detail in U.S. Pat. No. 3,872,487 issued to Nicholas Gold on Mar. 18, 1975 and entitled "Photographic Film Assemblage and Apparatus" and of such film units in, for example, U.S. Pat. Nos. 3,415,644; 3,594,165 and 3,761,268. Thus, the camera 10 is provided with means for facilitating the positioning of film in a plane in which it can be exposed.

As best seen in FIG. 2, the zone focusing optical system 22 is arranged along an optical axis, OA, intermediate an opening 20 (FIG. 1), which is located in a vertical forward wall 21 of the L-shaped housing 14 and which faces the scene to be photographed, and an entrance aperture 26 located in an opaque exposure chamber 24 (partly shown) which is positioned in a well-known manner inside the prismatic shaped housing 12 and also has a generally prismatic shape.

Located within the exposure chamber 24 is a trapezoidal-shaped mirror 54 (FIGS. 1 and 2) that is arranged at a predetermined angle with respect to the optical axis, OA, and the camera film plane to provide a folded light path of predetermined length therebetween along which image forming scene rays from the zone focusing optical system 22 travel to the film within the cassette 18 during a camera exposure cycle. The exposure chamber is of the type which is described in considerable detail in U.S. Pat. No. 4,057,815 issued to Bruce K. Johnson on Nov. 8, 1977 and entitled "Anti-Flare Structure For Photographic Optical System".

Film exposure is regulated by a well-known automatic exposure control system which operates to control the amount of exposure delivered to the film by selectively controlling the movement of a shutter blade mechanism generally designated at 28 in FIG. 1. The blade mechanism 28 comprises a pair of counter reciprocating blades, 30 and 32, each of which includes an aperture, 34 and 36 respectively, that are made to overlap one another to provide a preprogrammed set of aperture values and shutter speeds over the entrance aperture 26 to the camera light path. The blades, 30 and 32, are situated immediately forward of the camera light path entrance aperture 26 for this purpose and are of the type more fully described in U.S. Pat. No. 3,942,183 issued to George D. Whiteside on Mar. 2, 1976 and entitled "Camera With Pivoting Blades".

The exposure control system of the camera 10 operates in either an ambient mode in which available light provides the source for illuminating the scene or in an artificial light source mode in which an electronic strobe light 38 (FIG. 1), which forms a permanent part of the camera 10, serves as the scene illumination source.

Also provided in the camera 10, but not shown, is a well-known ultrasonic ranging system which operates on well-known principles. Ultrasonic energy is transmitted by the system toward a subject to be photographed and is thereafter reflected by the subject back toward the camera 10. Characteristics of the transmitted and received signals are then compared to derive a control signal representative of the subject distance. The control signal is thereafter utilized to drive a lens disk 56 which forms part of the zone focusing optical system 22. The lens disk 56 is preferably driven by the arrangement shown and described in U.S. Pat. No. 4,167,316 issued to Bruce K. Johnson et al. on Sept. 11, 1979 and entitled "Sonar Controlled Lens Focus Apparatus" the contents of which are specifically incorporated herein by reference as a "means for automatically indexing the lens disk 56 between angular positions".

Although reference should be had to the aforementioned U.S. Pat. No. 4,167,316 for complete details, the lens arrangement described therein comprises a plurality of lens elements mounted for displacement between a plurality of focal positions by a lens holding disc member disposed for rotation about a fixed center axis. The plurality of lens elements in the '316 patent are disposed in the lens holding disc member in circumferentially spaced-apart relation with respect to each other about the disc center axis. A scanning shutter blade arrangement similar to the blade apparatus 28 herein includes a walking beam to which the shutter blades are pivotally attached for movement thereby. The walking beam is pivotally disposed to impact upon an actuator member which, in turn, operates by way of a torsion spring to impact the lens holding disc member and thereby rotate the lens holding disc member so as to sequentially move each of its lens elements into their respective focal position.

One of the requirements for the above described sonar controlled lens focusing apparatus is that the lens disc which is to be used therewith must be of low inertia so that it can be properly driven by the lens disk actuator and also preferably will be as compact as possible so that the size of the system will be at a minimum. The lens disk 56 of the zone focusing optical system 22 of the invention satisfies these requirements as well as that of providing, in combination with the other components of the optical system 22, an inexpensive means of focusing the camera 10 so as to provide a well-corrected photographic image at the camera film plane for photographic subjects whose distance from the camera 10 can range from 24 inches to infinity. As will be seen from the description to follow, the zone focusing optical system 22 satisfies these requirements by providing a useful image that covers a semi-field angle of substantially 27 Deg. at an f-number of 10.

The structure and optical performance of the optical system 22 will best be understood by referring now to FIG. 2 wherein the optical system 22 can be seen to comprise an opaque housing section 42 which cooperates in a well-known manner with the prismatic-shaped housing 12 and the L-shaped housing 14 to enclose, protect and support various camera components. Included in the housing section 42 is an open-ended section 44 that is structured to admit light from a scene through the camera light path entrance aperture 26. For this purpose the open-ended section 44 has inlet aperture 46 and an outlet aperture 48 both of which are optically aligned along the optical axis, OA, with respect to one another and with the camera light path entrance aperture 26. Connecting the inlet and outlet apertures, 46 and 48, are intermediate convergent wall portions for excluding light from entering the camera housing and those portions are provided with internal serrations 50 which extend transverse to the optical axis, OA, and operate to intercept stray radiation thereby reducing the effects of unwanted or glare light.

The open-ended section 44 as can be seen is a funnel-like section preferably shaped in the form of a truncated right quadrangular pyramid with the apertures, 46 and 48, thereof lying in planes corresponding to the bases of the pyramid and wherein the intermediate connecting portions thereof correspond to the sides of the pyramid.

The open-ended section outlet aperture 48 is positioned adjacent the camera light path entrance aperture 26 and is spaced forwardly thereof to provide a predetermined space for the blades, 30 and 32, and the lens disk 56.

Mounted in optical registration with the open-ended section inlet aperture 46 is a prime positive meniscus lens 52. The meniscus lens 52 is optically structured, preferably from an optical plastic, to refract all the chief rays from all image forming bundles of rays originating at a predetermined object distance, less than infinity, from it so that those chief rays pass through the center of the open-ended section outlet aperture 48 and are imaged over the plane in which the film resides.

To provide its optical function, the meniscus lens 52 has an index, $n_d = 1.492$; an Abbe number, $V_e = 57.2$; front and rear surface basic vertex radii, $R_F = 0.775$ and $R_R = 1.185$ inches respectively; an axial thickness, $t_s = 0.125$ inches. The rear surface of the meniscus lens 52 is aspheric and is described by the following formula:

$$Z = \frac{1}{2R_R} y^2 + 0.137501 \, y^4 - 0.106603 \, y^6;$$

wherein Z represents the distance of a point on the aspheric surface measured from a reference plane perpendicular to the system optic axis, OA, and passing through the rear vertex of the lens 52 and y is the radial distance of the point away from the optic axis, OA. The aspheric rear surface of the meniscus lens 52 is structured primarily to correct the meniscus lens 52 for off-axis aberrations. With the foregoing structure, the meniscus lens 52 has an effective focal length of 4.144 inches (9.5 diopters) and, by itself, has the performance, in terms of field sags and RMS blur, indicated respectively in FIGS. 3 and 4 which will discussed further hereinafter.

The size of the cone of energy that reaches the camera film plane is defined by the joint action of the aperture 48 and the aperture defined by the blades 30 and 32. When the aperture defined by the blades, 30 and 32, is a maximum, either the aperture 48 or the aperture defined by the blades, 30 and 32, can be considered to be the aperture stop of the system 22, but when the aperture defined by the blades, 30 and 32, is smaller than that provided by the aperture 48, then the aperture defined by the blades, 30 and 32, can be considered to be the system aperture stop. The aperture 48 (FIG. 2) is spaced behind the meniscus lens 52 by a distance, $S_1$, measured from the meniscus rear surface vertex, of 0.369 inches and has a diameter of 0.372 inches.

The lens disk 56 is mounted for rotation in a well-known manner about a hub 58 thereof and includes a plurality of angularly spaced apart meniscus lens elements or light refracting zones indicated as the Roman numerals I through IV as shown in FIG. 1 and in part in FIG. 2. The rotational mounting arrangement of the lens disk 56 permits its meniscus elements, I through IV, to be selectively aligned in registration with and immediately behind the aperture 48.

Each of the lens disk meniscus elements, I through IV, is optically structured to operate in combination with the prime meniscus lens 52 to provide the system 22 with a plurality of effective focal lengths, different from one another, for focusing at different photographic subject distances. Lens I combines with the meniscus lens 52 to provide a combined focal length that best focuses objects located at 3.0 ft. with a subject range from 24 to 48 inches; lens II combines with the meniscus 52 to best focus objects located at 5.6 ft. with a subject range from 48 to 100.8 inches; lens III combines with the meniscus 52 to best focus objects at 12.6 ft. with a subject range from 100.8 to 201.6 inches; and lens IV and the meniscus 52 best focus objects at 50.0 ft. with a subject range from 201.6 inches to infinity (see FIGS. 5, 7, 9 and 11).

Each of the lens disk meniscus elements, I through IV, is also provided with at least one aspheric surface that is structured primarily to favorably correct residual spherical aberrations of the prime meniscus lens 52.

The lens disk meniscus elements, I through IV, have the characteristics represented by the following tabulated data which refers to FIG. 2.

| Lens | $n_d$ | V | Radii (in) | t (in) | $S_2$(in) | EFL (in) |
|---|---|---|---|---|---|---|
| I (3.0 ft) | 1.592 | 30.8 | $R_1 = -2.0$ $R_2 = -1.825$ | .0562 | .0793 | 29.974 |
| II (5.6 ft) | 1.592 | 30.8 | $R_3 = -10.0$ $R_4 = -8.695$ | .0553 | .0712 | 128.71 |
| III (12.6 ft) | 1.592 | 30.8 | $R_5 = -10.0$ $R_6 = -10.506$ | .0549 | .0712 | -413.9 |
| IV (50.0 ft) | 1.592 | 30.8 | $R_7 = -10.0$ $R_8 = -12.016$ | 0.547 | 0.0712 | -106.7 | wherein $n_d$ is the index of refraction, V is the Abbe number, $R_1, R_2 \ldots R_8$, represent basic radii of surfaces, t is the axial thickness, and $S_2$ is the axial distance from the aperture 48 to the vertex of a respective element; EFL is effective focal length; and wherein the front surface of element I is an aspheric surface described by the formula:

$$Z = \frac{1}{2R_1} y^2 - .21518 y^4 - .01655 y^6$$

and elements II, III and IV all have aspheric front surfaces described by the formula:

$$Z = -0.05 y^2 - 0.151589 y^4 + 0.824884 y^6$$

the Z in all of the foregoing aspheric formulas representing the distance of a point on the aspheric surface measured from a reference plane perpendicular to the system optic axis and through the vertex of a respective optical element and y is the radial distance of the point away from the optic axis.

The lens disk 56 and the meniscus lens elements, I through IV, are preferably integrally molded of a transparent optical plastic and the aperture 48, being spaced forward of each lens disk meniscus, provides a masking function by defining the active refracting area of each lens disk meniscus element when such an element is brought into registration with the aperture 48.

Moreover, as illustrated in FIG. 2, the clear openings of the converging section inlet aperture 46 and aperture 48, and the spacing separating them are selected so that the usable refracting area of the prime meniscus lens 52 exceeds the usable refracting area of each of the lens disk meniscus elements, I through IV, by as much as optical considerations permit in order to minimize the overall space requirements for the lens disk 56. In the preferred embodiment, the prime meniscus refracting area is approximately 4.16 times larger than each lens disk meniscus element refracting area thus permitting the lens disk 56 to be quite small and of low inertia.

Referring now generally to FIGS. 3–12, there are shown a series of graphs which represent the results of well-known computer generated spot diagrams for the prime meniscus lens 52 with and without the lens disk meniscus elements, I through IV, as those elements are described in the above tabular data. Each curve is plotted from spot diagrams for theoretical object point sources on-axis, at 0.4, 0.7, and full field (1.0=27 Deg.). Each spot diagram is produced by 300 rays traced in three colors (100 in each color and with C, D and F lines given equal weighting) with each ray originating at one of the point sources and landing on a reference plane coincident with the camera film plane.

Figure 4:
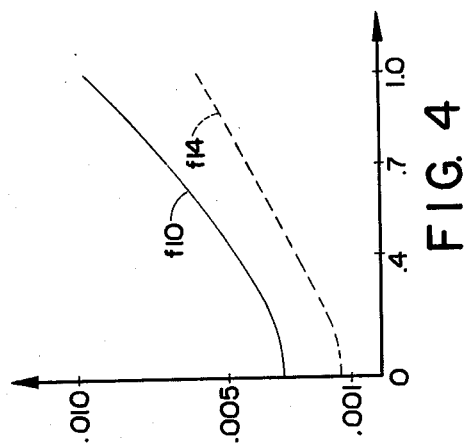
FIGS. 3 and 4 are lens performance graphs showing, respectively, field sags and RMS blur, normalized to 1.0 at full half field angle, for an aspherized meniscus lens which serves as the primary lens of the invention.

FIG. 4 shows the RMS (Root Mean Square) blur of the prime meniscus lens 52 operating by itself at f-numbers of f/10 defined by the apertures 48 and 26 and f/14 which can be provided by the blades 30 and 32.

RMS blur corresponds to the circle of confusion and represents the combined effect of all aberrations except distortion. RMS blur is calculated in a well-known manner by first determining the centroid of the spot diagram and then the length of vectors drawn from the spot diagram centroid to each spot, the point where the ray lands in a reference plane. The root-mean-square magnitude of the vectors is then calculated to yield the RMS blur, a radius. If the reference plane is the camera film plane, as here, and the film is flat, blur will become visible at an RMS blur value of 0.0018 inches which corresponds to the conventional circle of confusion diameter of 0.005 inches. An RMS blur radius of 0.005 inches or less is desirable for optimum photographic image quality, particularly within the 0.7 angular field limit where most of the photographic subject is usually found, but RMS blur values in excess of 0.005 inches can be tolerated outside the 0.7 angular field limit. On this basis, the meniscus lens 52 could not be used by itself at f/10 but could be used at f/14 (see FIG. 4).

Figure 3:
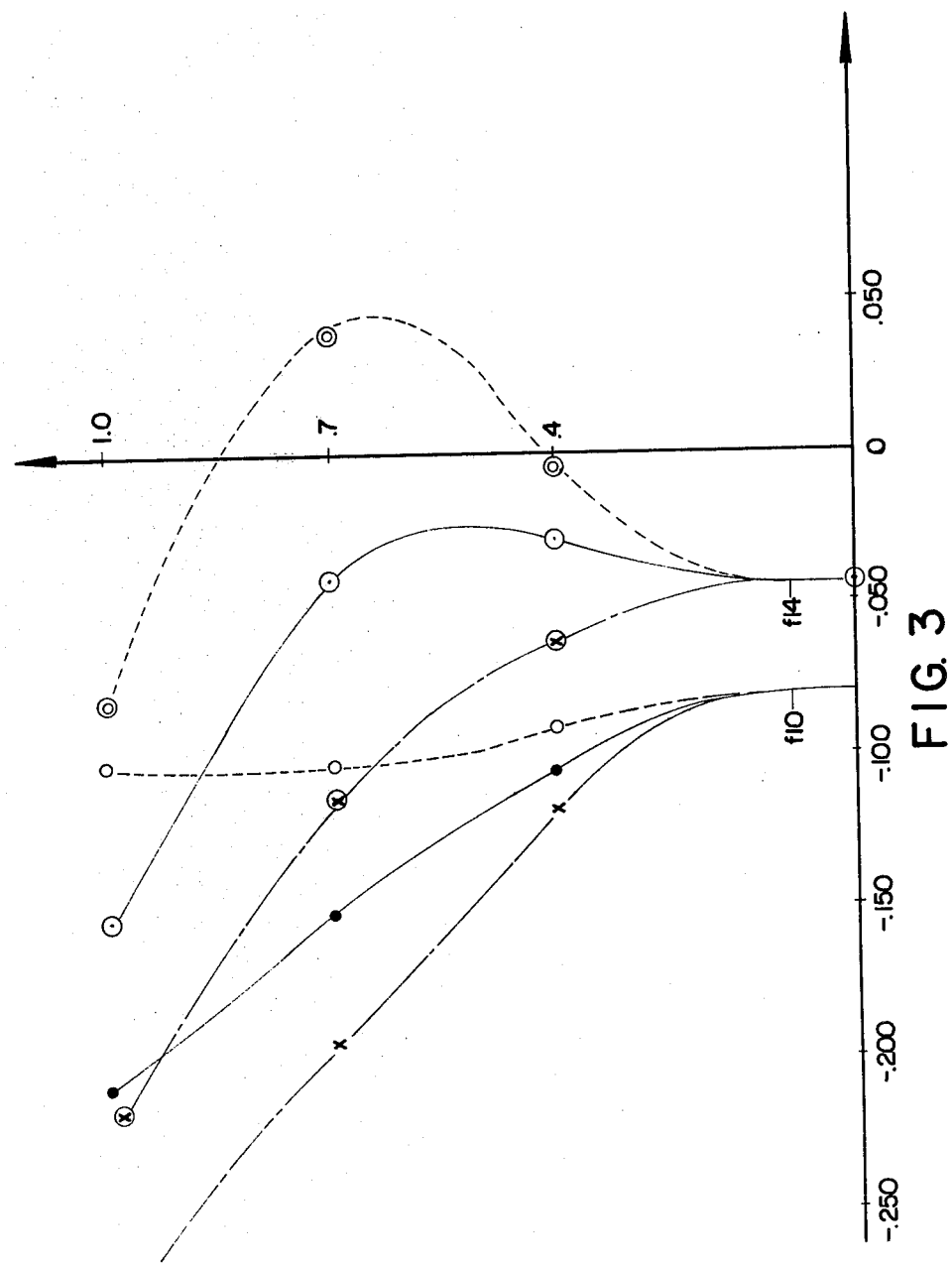
Figure 6:
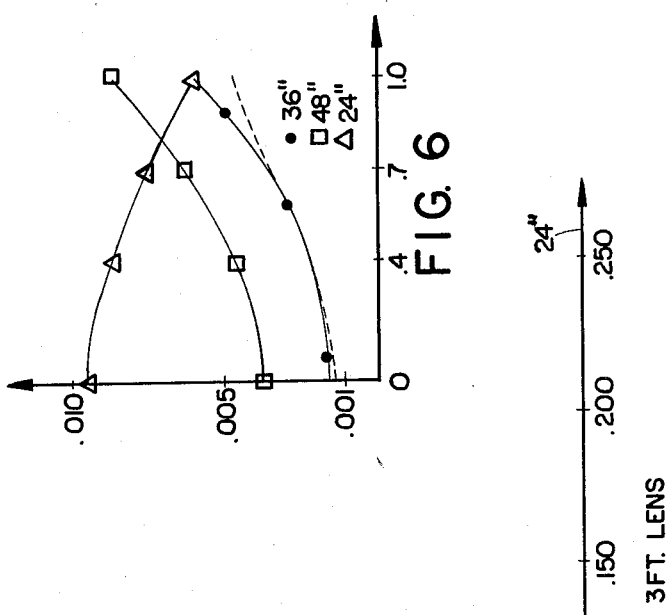
Figure 5:
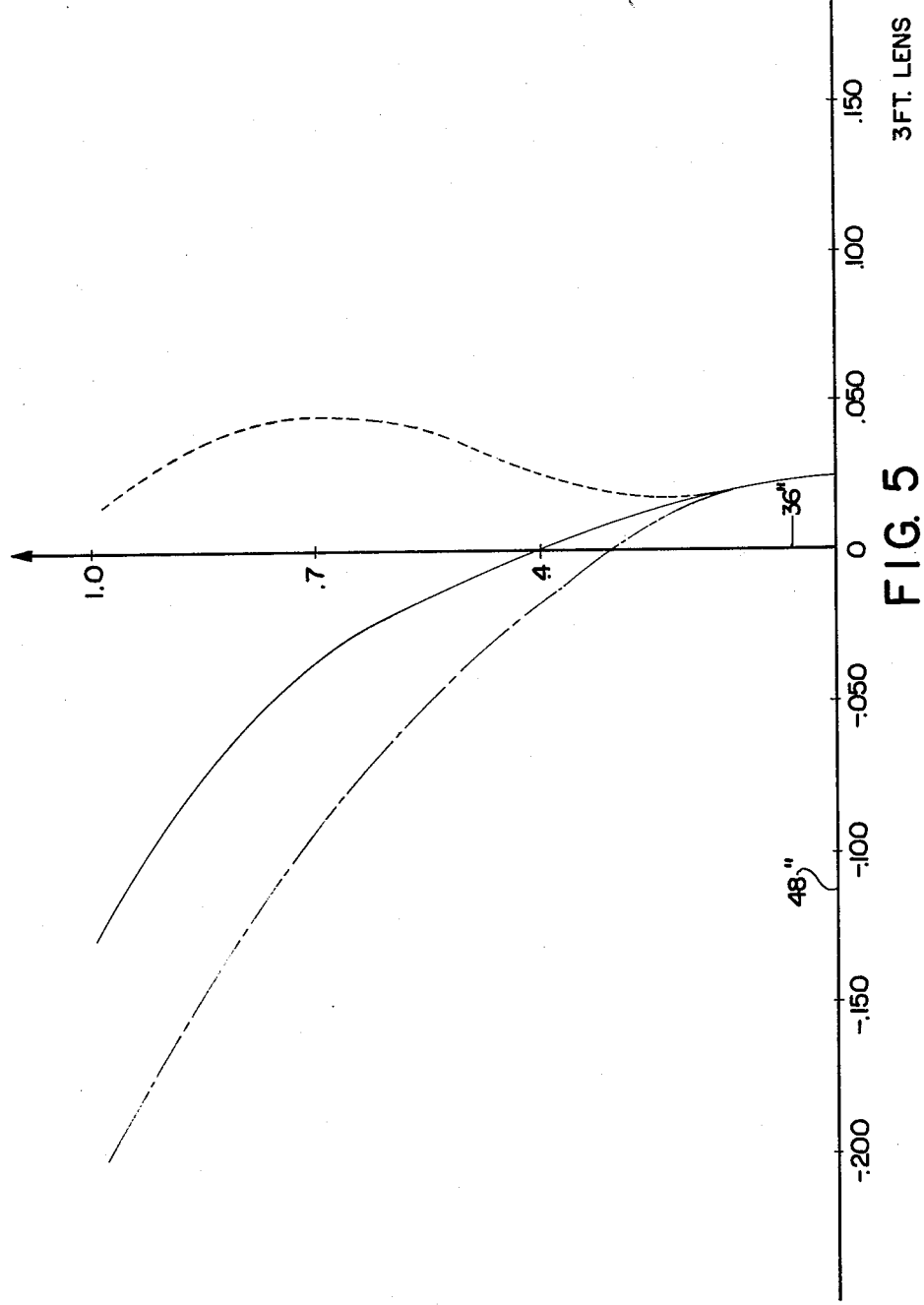

FIG. 3 represents the field sag of the meniscus lens 52 again, by itself, at f-numbers of f/10 and f/14. Each graph describes the field coverage of the lens, its astigmatism and its state of focus. Sagittal points on the graphs are connected with dash and dot lines; tangential points are connected with dash lines. The combined effects of all aberrations, except distortion, from the reference plane is the RMS blur graph plotted with solid lines. The solid line is the best RMS image surface or, in other words, the locus of the circle of least confusion in the RMS sense. The vertical axis of FIG. 3 is the same as the horizontal axis of FIG. 4. The horizontal axis of FIG. 3 represents axial displacement of the RMS blur away from the reference plane.

FIGS. 6, 8, 10 and 12 represent the RMS blur for each of the lens disk meniscus elements I through IV in combination, respectively, with the prime meniscus lens 52 and RMS blur was calculated as described above for best focus and for two other focus distances corresponding to the subject distance range for the particular combination.

FIGS. 5, 7, 9 and 11 show the field sags for each of the lens disk meniscus elements I through IV in combination, respectively, with the prime meniscus lens 52.

FIGS. 13-15 represent the RMS blur for the 3 ft. lens disk meniscus, element I, in combination with the prime meniscus 52 at the focus distances indicated and as a function of f-number. Similarly, FIGS. 16-18 represent the RMS blur for the 5.6 ft. lens disk meniscus, element II, in combination with the prime meniscus 52.

Although the RMS blur performance for the optical system 22 is somewhat degraded, i.e., above a 0.005 circle of confusion, at semifield angles greater than 0.7 of full field when operating at an f-number of f/10, the exposure control system of the camera 10 is preferably programmed so that the blades, 30 and 32 (see FIG. 2), under both ambient and artificial light source exposure modes and in all but extreme exposure conditions, like very low available light in the ambient mode or far subject distances in the artificial light source illumination mode, define f-numbers larger than f/10. Under normal scene illumination conditions the optical system 22 will not operate at f/10 and therefore the RMS performance beyond the 0.7 semi-field angle is not a significant consideration for most purposes likely to be encountered.

Certain changes may be made in the above-described embodiment without departing from the scope of the invention, and those skilled in the optical arts may make still other changes according to the teachings of the disclosure. For example, the size of the optical system 22 may be scaled up or down in a well-known manner so long as the changes in optical performance which attend such scale changes do not exceed the allowable limits for the particular photographic application. Therefore, it is intended that all matter contained in the above description or shown in the accompanying drawings shall be interpreted as illustrative and not in a limiting sense.

What is claimed is:

1. A zone focusing optical system for use with photographic camera apparatus of the type which includes means for facilitating the positioning of film in a plane in which it may be exposed and providing a path of predetermined length along which light can be directed through an entrance aperture thereof toward the plane, said system comprising:

means for defining an opaque housing structured to admit light from a scene into the apparatus light path entrance, said housing including an open-ended section having spaced apart inlet and outlet apertures optically aligned with respect to one another and with the apparatus light path entrance along an axis which extends through the center of the apparatus light path entrance, said section including intermediate opaque convergent portions which connect said inlet and outlet apertures thereof for excluding light from entering said housing, said outlet aperture being positioned adjacent the apparatus light path entrance and spaced forwardly thereof by a predetermined distance;

a prime lens of predetermined positive power mounted in optical registration with said inlet aperture and structured to refract all the chief rays from all image forming bundles of rays originating at a predetermined object distance from said prime lens, less than infinity, so that said chief rays pass through the center of said outlet aperture and are imaged over the film plane; and a lens disk including a plurality of angularly spaced apart light refracting zones each of which is structured to optically cooperate with said prime lens to in combination therewith image an object at a different distance from said prime lens than said predetermined object distance from said prime lens, said lens disk being mounted behind said outlet aperture in said predetermined space between said outlet aperture and the apparatus light path entrance for rotation such that each light refracting zone thereof can be selectively indexed into optical registration with said outlet aperture, said outlet aperture operating to define the active light refracting area of each of said light refracting zones and to define a maximum aperture stop for each of said light refracting zones in combination with said prime lens.

2. The system of claim 1 further including means for automatically indexing said lens disk between angular positions corresponding to said angular spacings separating said refracting zones thereof.

3. The system of claim 1 wherein said open-ended section is shaped in the form of a truncated right quadrangular pyramid with said apertures thereof lying in planes corresponding to the bases of said pyramid and wherein said intermediate portions thereof correspond to the sides of said pyramid.

4. The system of claim 3 wherein said intermediate portions include serrations extending transverse to said section axis for intercepting stray radiation to reduce the effects of glare light.

5. The system of claim 1 wherein the openings of said inlet and said outlet apertures and the spacing separating them are selected so that the usable refracting area of said prime lens exceeds the usable refracting area of each of said lens disk refracting zones by a factor of approximately 4.16.

6. The system of claim 1 wherein said predetermined power of said prime lens is 9.5 diopters having an effective focal length of 4.1440 inches and wherein said refracting zones of said lens disk number four having effective focal lengths of 29.974, 128.71, −413.9, and −106.7 inches respectively.

7. The system of claims 1 or 6 wherein said prime lens and each of said lens disk refracting zones comprise meniscus lenses.

8. The system of claim 1 wherein said lens disk, including said light refracting zones thereof, is integrally molded of a transparent optical plastic.

* * * * *

UNITED STATES PATENT AND TRADEMARK OFFICE
CERTIFICATE OF CORRECTION

PATENT NO. : 4,240,724
DATED : December 23, 1980
INVENTOR(S) : Bruce K. Johnson

It is certified that error appears in the above-identified patent and that said Letters Patent are hereby corrected as shown below:

On the Title Page

The Attorney, Agent or Firm should be --Francis J. Caufield-- instead of "Samuel H. Dworetsky; Peter V. D. Wilde".

Signed and Sealed this

Fourth Day of August 1981

[SEAL]

Attest:

GERALD J. MOSSINGHOFF

Attesting Officer     Commissioner of Patents and Trademarks